(12) United States Patent
Auvray et al.

(10) Patent No.: US 12,537,117 B2
(45) Date of Patent: Jan. 27, 2026

(54) PROCESS FOR THE MANUFACTURE OF A FIRE-RESISTANT AND/OR FIRE-RETARDANT CABLE

(71) Applicant: NEXANS, Courbevoie (FR)

(72) Inventors: Thierry Auvray, Lyons (FR); Franck Gyppaz, Lyons (FR)

(73) Assignee: NEXANS, Courbevoie (FR)

( * ) Notice: Subject to any disclaimer, the term of this patent is extended or adjusted under 35 U.S.C. 154(b) by 480 days.

(21) Appl. No.: 18/011,102

(22) PCT Filed: Jun. 17, 2021

(86) PCT No.: PCT/FR2021/051093
§ 371 (c)(1),
(2) Date: Jun. 28, 2023

(87) PCT Pub. No.: WO2021/255394
PCT Pub. Date: Dec. 23, 2021

(65) Prior Publication Data
US 2023/0335311 A1    Oct. 19, 2023

(30) Foreign Application Priority Data

Jun. 19, 2020 (FR) ...................................... 2006409

(51) Int. Cl.
| | |
|---|---|
| *H01B 7/295* | (2006.01) |
| *C04B 20/00* | (2006.01) |
| *C04B 22/12* | (2006.01) |
| *C04B 24/38* | (2006.01) |
| *C04B 28/00* | (2006.01) |
| *D06M 11/79* | (2006.01) |
| *D06M 15/11* | (2006.01) |
| *D06M 15/13* | (2006.01) |
| *H01B 13/22* | (2006.01) |
| *C04B 111/00* | (2006.01) |
| *C04B 111/28* | (2006.01) |

(52) U.S. Cl.
CPC ......... *H01B 7/295* (2013.01); *C04B 20/0048* (2013.01); *C04B 22/124* (2013.01); *C04B 24/38* (2013.01); *C04B 28/006* (2013.01); *D06M 11/79* (2013.01); *D06M 15/11* (2013.01); *D06M 15/13* (2013.01); *H01B 13/22* (2013.01); *C04B 2111/00612* (2013.01); *C04B 2111/28* (2013.01); *D06M 2200/30* (2013.01); *D06M 2400/02* (2013.01)

(58) Field of Classification Search
CPC ......... D06M 2400/02; D06M 2200/30; D06M 15/13; D06M 15/11; D06M 11/79; C04B 2111/28; C04B 2111/00612; C04B 28/006; C04B 24/38; C04B 22/124; C04B 20/0048; H01B 13/22; H01B 7/295
See application file for complete search history.

(56) References Cited

U.S. PATENT DOCUMENTS 5,338,349 A * 8/1994 Farrar ..................... C04B 26/04
428/920
2017/0345528 A1* 11/2017 Gyppaz ................ C04B 28/006

OTHER PUBLICATIONS

International Search Report Oct. 29, 2021.

* cited by examiner

*Primary Examiner* — Vishal I Patel
(74) *Attorney, Agent, or Firm* — MUNCY, GEISSLER, OLDS & LOWE, P.C.

(57) ABSTRACT

The present invention relates to a process for the manufacture of a cable employing the impregnation of a non-woven fibrous material with a liquid geopolymer composition and the addition of at least one precursor composition of a gel to the liquid geopolymer composition.

15 Claims, 2 Drawing Sheets

PROCESS FOR THE MANUFACTURE OF A FIRE-RESISTANT AND/OR FIRE-RETARDANT CABLE

RELATED APPLICATION

This application is a National Phase of PCT/FR2021/051093 filed on Jun. 17, 2021, which claims the benefit of priority from French Patent Application No. 20 06409, filed on Jun. 19, 2020, the entirety of which are incorporated by reference.

FIELD OF THE INVENTION

The present invention relates to a process for the manufacture of a cable employing the impregnation of a non-woven fibrous material with a liquid geopolymer composition and the addition of at least one precursor composition of a gel to the liquid geopolymer composition.

It applies typically but not exclusively to fire-retardant and/or fire-resistant cables intended for the transportation of energy and/or for the transmission of data, such as fire-retardant and/or fire-resistant electric and/or optical safety cables, in particular halogen-free, capable of operating for a given period of time under fire conditions without, however, being a fire propagator or a significant smoke generator. These safety cables are in particular medium-voltage (especially from 6 to 45-60 kV) power transportation cables or low-frequency transmission cables, such as control cables or signalling cables.

PRIOR ART

WO 2016/099200 describe a process for the manufacture of a fire-resistant cable comprising the following stages: a stage of preparation of a geopolymer composition comprising a sodium silicate, water, potassium hydroxide, an aluminosilicate and polypropylene fibres; a stage of winding a non-woven paper tape around an assembly of copper conductors; a stage of impregnation, by dipping coating, of the copper conductors/non-woven paper tape assembly in the preprepared geopolymer composition, in order to form a composite layer surrounding the copper conductors; then a stage of hot extrusion of a protective polymer sheath. The process is lengthy, in particular because of the drying stage, and cannot be carried out continuously. Furthermore, the constituent elements of the cable close to the composite layer based on a geopolymer material can be easily contaminated by the geopolymer composition and/or stick to said composite layer, which is not desired.

OBJECTS AND SUMMARY

One aim of the invention is to overcome all or part of the abovementioned disadvantages, and to provide a process for the manufacture of a flame-retardant cable, said process being easy to carry out, in particular easy to operate industrially, economic and rapid, and making it possible to result in a cable exhibiting good mechanical properties, in particular in terms of flexibility and of durability.

A first subject-matter of the invention is a process for the manufacture of a cable comprising at least one elongated electrically conductive element and at least one composite layer surrounding said elongated electrically conductive element, characterized in that it comprises at least the following stages:

i) impregnating a non-woven fibrous material, preferably in the form of a tape or of a strip, with a liquid geopolymer composition, and ii) forming a gel encapsulating or supporting said non-woven fibrous material, said gel comprising a geopolymer material, and and in that said process additionally comprises a stage a) of addition of a gelling composition to the liquid geopolymer composition, in order to form said gel during stage ii).

The process of the invention is rapid, easy to carry out, in particular at the industrial level, and economic, and it guarantees that a fire-resistant and/or fire-retardant cable exhibiting good mechanical properties, in particular in terms flexibility and durability, is obtained. Furthermore, the process of the invention makes it possible to protect the composite layer, and in particular to prevent contamination of the constituent elements of the cable close to the composite layer by the liquid geopolymer composition, or their adhesion to said composite layer. In particular, the inventors of the present patent application have observed that the presence of a gelling composition in the liquid geopolymer composition makes it possible to reduce the release of water over time, and in particular during the process, which is harmful to the manufacture of the cable.

Stage i) of Impregnation of the Non-Woven Fibrous Material

The Liquid Geopolymer Composition

The liquid geopolymer composition used in stage i) is preferably a liquid geopolymer composition at ambient temperature, i.e. at a temperature ranging from 18 to 25° C. approximately.

The liquid geopolymer composition of stage i) is preferably a liquid aluminosilicate geopolymer composition.

The liquid geopolymer composition of the invention is particularly preferably a liquid geopolymer composition comprising water, silicon (Si), aluminium (Al), oxygen (O) and at least one element chosen from potassium (K), sodium (Na), lithium (Li), caesium (Cs) and calcium (Ca) and preferably chosen from potassium (K) and sodium (Na).

The liquid geopolymer composition can in particular comprise at least one first aluminosilicate, at least one first alkaline silicate, water and optionally an alkaline base.

In the invention, the liquid geopolymer composition is a precursor composition of a geopolymer. In other words, it comprises ingredients (first aluminosilicate, at least one first alkaline silicate, water and optionally an alkaline base; or first metakaolin, second metakaolin, first alkaline silicate, water and optionally an alkaline base and/or a second alkaline silicate, such as defined below) which geopolymerize together (by polycondensation) to form a geopolymer, also known as geopolymer material, as defined in the invention.

The First Aluminosilicate

The first aluminosilicate can be chosen from metakaolins (i.e. calcined kaolins), fly ash, blast furnace slag, bloating clays, such as bentonite, calcined clays, any type of compound comprising aluminium and silica fume, zeolites and one of their mixtures.

Among these compounds, metakaolins are preferred, in particular those sold by Imérys.

In the invention, the expression "metakaolin" means a calcined kaolin or a dehydroxylated aluminosilicate. It is preferably obtained by dehydration of kaolin or of a kaolinite. This dehydration is conventionally obtained by calcination.

The liquid geopolymer composition can comprise from 5% to 50% by weight approximately of aluminosilicate and preferably from 10% to 35% by weight approximately of aluminosilicate, with respect to the total weight of the liquid geopolymer composition.

The liquid geopolymer composition can additionally comprise a second aluminosilicate different from the first aluminosilicate.

Preferably, the liquid geopolymer composition comprises two calcined kaolins having different calcination temperatures.

According to a particularly preferred embodiment of the invention, the liquid geopolymer composition comprises a first metakaolin chosen from kaolins calcined at a temperature $T_{c1}$ of at least 650° C. approximately and a second metakaolin chosen from kaolins calcined at a temperature $T_{c2}$ such that $T_{c2}-T_{c1} \geq 100°$ C. approximately, at least one first alkaline silicate, water and optionally an alkaline base. The liquid geopolymer composition can then exhibit improved mechanical properties, in particular in terms of flexibility and of durability, while guaranteeing good fire resistance and reaction properties.

As the second metakaolin is chosen from kaolins calcined at a temperature $T_{c2}$ such that $T_{c2}-T_{c1} \geq 100°$ C. approximately, it is different from the first metakaolin as defined in the invention.

According to one embodiment of the invention, the first metakaolin is a kaolin calcined at a temperature $T_{c1}$ of at least 700° C. approximately and preferably of at least 725° C. approximately.

According to a preferred embodiment of the invention, the first metakaolin is a kaolin calcined at a temperature $T_{c1}$ of at most 875° C. approximately and preferably of at most 825° C. approximately.

The first metakaolin can comprise at least 20 mol % approximately and preferably at least 30 mol % approximately of aluminium oxide ($Al_2O_3$), with respect to the total number of moles of the first metakaolin.

The first metakaolin can comprise at most 60 mol % approximately and preferably at most 50 mol % approximately of aluminium oxide ($Al_2O_3$), with respect to the total number of moles of the first metakaolin.

The first metakaolin can comprise at least 35 mol % approximately and preferably at least 45 mol % approximately of silicon oxide ($SiO_2$), with respect to the total number of moles of the first metakaolin.

The first metakaolin can comprise at most 75 mol % approximately and preferably at most 65 mol % approximately of silicon oxide ($SiO_2$), with respect to the total number of moles of the first metakaolin.

Mention may be made, as examples of first metakaolin, of the metakaolins sold by Imérys, in particular that sold under the reference PoleStar® 450.

The first metakaolin can be chosen from the kaolins calcined at Ti as defined in the invention, for at least 1 min approximately, preferably for at least 10 min approximately, particularly preferably for a period of time ranging from approximately 30 min to 8 h and more particularly preferably for a period of time ranging from approximately 2 h to 6 h.

The second metakaolin is preferably chosen from the kaolins calcined at a temperature $T_{c2}$ such that $T_{c2}-T_{c1} \geq 150°$ C. approximately, particularly preferably such that $T_{c2}-T_{c1} \geq 200°$ C. approximately and more particularly preferably such that $T_{c2}-T_{c1} \geq 250°$ C. approximately.

According to one embodiment of the invention, the second metakaolin is a kaolin calcined at a temperature $T_{c2}$ of at least 800° C. approximately, preferably of at least 850° C. approximately and particularly preferably of at least 900° C. approximately.

According to a preferred embodiment of the invention, the second metakaolin is a kaolin calcined at a temperature $T_{c2}$ of at most 1200° C. approximately and preferably of at most 1150° C. approximately.

The second metakaolin can comprise at least 20 mol % approximately and preferably at least 30 mol % approximately of aluminium oxide ($Al_2O_3$), with respect to the total number of moles of the second metakaolin.

The second metakaolin can comprise at most 60 mol % approximately and preferably at most 50 mol % approximately of aluminium oxide ($Al_2O_3$), with respect to the total number of moles of the second metakaolin.

The second metakaolin can comprise at least 35 mol % approximately and preferably at least 45 mol % approximately of silicon oxide ($SiO_2$), with respect to the total number of moles of the second metakaolin.

The second metakaolin can comprise at most 75 mol % approximately and preferably at most 65 mol % approximately of silicon oxide ($SiO_2$), with respect to the total number of moles of the second metakaolin.

Mention may be made, as examples of second metakaolin, of the metakaolins sold by Imérys, in particular that sold under the reference PoleStar® 200R.

The second metakaolin can be chosen from the kaolins calcined at $T_{c2}$ as defined in the invention, for at least 1 min approximately, preferably for at least 5 min approximately, particularly preferably for a period of time ranging from approximately 10 min to 2 h and more particularly preferably for a period of time ranging from approximately 15 min to 1 h.

The [first metakaolin/second metakaolin] ratio by weight in the liquid geopolymer composition preferably ranges from 0.1 to 2 approximately, particularly preferably from 0.5 to 1.0 approximately and more particularly preferably is approximately 1.

The liquid geopolymer composition can comprise from 5% to 50% by weight approximately and preferably from 10% to 35% by weight approximately of first and second metakaolins, with respect to the total weight of the liquid geopolymer composition.

The first and second metakaolins can be analysed by differential thermal analysis (DTA) [absence or presence of a crystallization point or peak], nuclear magnetic resonance (NMR) [$^{27}Al$ NMR spectrum] and/or x-ray diffraction (XRD).

The first metakaolin preferably exhibits a crystallization peak by differential thermal analysis, particularly preferably at a temperature ranging from 900 to 1060° C. and more particularly preferably at a temperature ranging from 950 to 1010° C.

The second metakaolin preferably comprises mullite.

The First Alkaline Silicate

The first alkaline silicate can be chosen from sodium silicates, potassium silicates and one of their mixtures.

The alkaline silicates sold by Silmaco or by PQ Corporation are preferred. The first alkaline silicate is preferably a sodium silicate.

The first alkaline silicate can have a $SiO_2/M_2O$ molar ratio ranging from 1.1 to 35 approximately, preferably from 1.3 to 10 approximately and particularly preferably from 1.4 to 5 approximately, with M being a sodium or potassium atom and preferably a sodium atom.

The liquid geopolymer composition can comprise from 5% to 60% by weight approximately and preferably from 10% to 50% by weight approximately of first alkaline silicate, with respect to the total weight of the liquid geopolymer composition.

The Second Alkaline Silicate

The liquid geopolymer composition can additionally comprise a second alkaline silicate different from the first alkaline silicate.

The second alkaline silicate can be chosen from sodium silicates, potassium silicates and one of their mixtures. The alkaline silicates sold by Silmaco or by PQ Corporation are preferred. The second alkaline silicate is preferably a sodium silicate.

The first and second alkaline silicates can respectively have $SiO_2/M_2O$ and $SiO_2/M'_2O$ molar ratios such that M and M', which are identical, are chosen from a sodium atom and a potassium atom, and preferably a sodium atom, and the said ratios have different values, preferably values such that their difference is at least 0.3, particularly preferably such that their difference is at least 0.5 and more particularly preferably such that their difference is at least 1.0.

According to one embodiment of the invention, the liquid geopolymer composition comprises:
  a first alkaline silicate having a $SiO_2/M_2O$ molar ratio ranging from 1.5 to 2.6 approximately, and
  a second alkaline silicate having a $SiO_2/M'_2O$ molar ratio of greater than 2.6, preferably ranging from 2.8 to 4.5 approximately and particularly preferably ranging from 3.0 to 4.0 approximately, it being understood that M' is identical to M.

The liquid geopolymer composition can comprise from 10% to 60% by weight approximately and preferably from 20% to 50% by weight approximately of first and second alkaline silicates, with respect to the total weight of the liquid geopolymer composition.

The [first alkaline silicate/second alkaline silicate] ratio by weight in the liquid geopolymer composition preferably ranges from 0.5 to 2.5 and particularly preferably from 0.8 to 2.0.

The Alkaline Base

The alkaline base can be sodium hydroxide or potassium hydroxide and preferably sodium hydroxide.

The liquid geopolymer composition can be devoid of alkaline base. This thus makes it possible to improve the handling of the liquid geopolymer composition, in particular during the preparation of a cable.

The solid substances/water ratio by weight in said liquid geopolymer composition determines the kinetics of solidification during stage ii).

The liquid geopolymer composition can comprise from 35% to 80% by weight approximately and particularly preferably from 40% to 70% by weight approximately of solid substances (alkaline silicate(s), aluminosilicate(s) and alkaline base), with respect to the total weight of said liquid geopolymer composition.

The liquid geopolymer composition can additionally comprise one or more additives chosen from:
  a dye,
  inorganic fibres, in particular chosen from alumina or basalt fibres,
  a compound which accelerates setting, in particular chosen from aluminium sulfate, alums (e.g. potassium aluminium double sulfate), calcium chloride, calcium sulfate, hydrated calcium sulfate, sodium aluminate, sodium carbonate, sodium chloride, sodium silicate, sodium sulfate, iron(III) chloride and sodium lignosulfonates,
  a setting retarder, in particular chosen from ammonium, alkali metals, alkaline earth metals, borax, lignosulfonates and in particular metal salts of calcium lignosulfonates, sulfoalkylated lignins, such as, for example, sulfomethylated lignin, hydroxycarboxylic acids, copolymers of salts of 2-acrylamido-2-methylpropanesulfonic acid and of acrylic acid or of maleic acid, and saturated salts,
  an inert filler, in particular chosen from talc, micas, dehydrated clays and calcium carbonate,
  an expanded carbon material, such as an expanded graphite.

The dye is preferably a dye which is liquid at ambient temperature (i.e. at 18-25° C.).

The liquid geopolymer composition can comprise from 0.01% to 15% by weight approximately of additive(s), preferably from 0.1% to 8% by weight approximately of additive(s) and particularly preferably from 0.5% to 5% by weight approximately of additive(s), with respect to the total weight of the liquid geopolymer composition.

The Non-Woven Fibrous Material

In stage i), the non-woven fibrous material is preferentially provided in the form of a tape or of a strip.

The non-woven fibrous material preferably has a supple and flexible structure.

The non-woven fibrous material can be chosen from cellulose materials, materials based on synthetic organic polymers, glass fibres and one of their mixtures and preferably from materials based on synthetic organic polymers.

The cellulose materials can be chosen from paper, in particular blotting paper; non-woven materials manufactured from functionalized or non-functionalized cellulose; matrices having a cellular and/or fibrous structure manufactured from natural cellulose acetate fibres.

The materials based on synthetic organic polymers can be chosen from polymer materials having a porous and/or fibrous matrix of polyolefin(s), in particular those chosen from propylene homo- and copolymers, ethylene homo- and copolymers, high-density polyethylenes (HDPEs), aromatic polyamides (aramids), polyesters and one of their mixtures.

According to a preferred embodiment of the invention, the non-woven fibrous material is a polyethylene terephthalate (PET).

The non-woven fibrous material preferably exhibits a weight per unit area ranging from 50 to 120 $g/cm^2$ approximately. This thus makes it possible to obtain a composite layer which is sufficiently flexible to be able to be easily handled and sufficiently robust to obtain good fire protection.

Stage i) can be carried out manually or in automated fashion and preferably in automated fashion.

When it is carried out in automated fashion, stage i) is carried out at a speed ranging from 20 to 280 m/min approximately and preferably ranging from 50 to 150 m/min approximately.

The impregnation stage i) can be carried out on the non-woven fibrous material alone (hereinafter referred to as first alternative form) or on a non-woven fibrous material/cable assembly comprising at least one elongated electrically conductive element (hereinafter referred to as second alternative form).

First Alternative Form

According to the first alternative form, stage i) is a stage i-af1) and it is preferably carried out by coating impregnation and particularly preferably by pre-controlled coating.

Stage i-af1) can, for example, be carried out using a coating device, such as a coating die. This device is particularly appropriate for impregnating a non-woven fibrous material alone, i.e. when it is not yet applied around the cable.

Stage i-af1) is more particularly carried out by passing the non-woven fibrous material into a coating device, such as a coating die, said device being fed with the liquid geopolymer composition, in particular using means such as a pump. This thus makes it possible to directly dispense the desired amount of the liquid geopolymer composition uniformly over the entire desired width of said non-woven fibrous material.

Stage i-af1) can in particular be a coating known under the term "tensioned web die coating".

In a preferred embodiment of the invention, the impregnation stage i-af1) is carried out at a temperature ranging from 15° C. to 90° C. approximately and particularly preferably from 20° C. to 40° C. approximately.

In this first alternative form, the non-woven fibrous material can be positioned on a dispenser, such as an unwinder or reel, and said material can be dispensed or unwound continuously in order to carry out at least stage i).

Preferably, according to the first alternative form of the invention, stage i-af1) is carried out by passing the non-woven fibrous material into a coating device fed with the liquid geopolymer composition with a flow rate D (in kg/min), the dispenser delivers the non-woven fibrous material at a speed V (in km/min) and the D/V ratio ranges from approximately 20 to 50 kg of liquid geopolymer composition/km of non-woven fibrous material and particularly preferably from approximately 25 to 40 kg of liquid geopolymer composition/km of non-woven fibrous material. The amount of liquid geopolymer composition applied to the non-woven fibrous material can thus be easily adjusted by a pump.

The speed V is preferably identical to the speed of forward progression of the cable.

The flow rate D can range from 0.5 kg/min to 4.5 kg/min approximately.

The speed V can range from 20 m/min to 280 m/min approximately and preferably from 50 m/min to 150 m/min approximately.

Second Alternative Form

According to the second alternative form, stage i) is a stage i-af2) and it is preferably carried out by dipping coating.

Stage i-af2) can, for example, be carried out using an impregnation bath or vat comprising the liquid geopolymer composition into which the cable, comprising at least one elongated electrically conductive element and a non-woven fibrous material surrounding said elongated electrically conductive element, is introduced.

The impregnation bath or vat is preferably configured in order to make possible the passage of the cable, comprising at least one elongated electrically conductive element and a non-woven fibrous material surrounding said elongated electrically conductive element, through said impregnation bath.

The liquid geopolymer composition is then introduced into said impregnation bath, in order to make possible stage i-af2).

The impregnation bath or vat is preferably fed with the liquid geopolymer composition, in particular using means such as a pump. This thus makes it possible to continuously feed said bath or vat with liquid geopolymer composition.

In a preferred embodiment of the invention, the impregnation stage i-af2) is carried out at a temperature ranging from 15° C. to 40° C. approximately and particularly preferably from 20° C. to 30° C. approximately.

The speed V is preferably identical to the speed of forward progression of the cable.

Preferably, stage i-af2) is carried out by passing the cable, comprising said elongated electrically conductive element and said non-woven fibrous material surrounding said elongated electrically conductive element, into an impregnation bath or vat fed with the geopolymer composition with a flow rate D (in kg/min). The flow rate D can range from 0.5 kg/min to 4.5 kg/min approximately.

The speed of forward progression of the cable in stage i-af2) can range from 20 m/min to 280 m/min approximately and preferably from 50 m/min to 150 m/min approximately.

The non-woven fibrous material impregnated with the liquid geopolymer composition (first alternative form) or the cable/non-woven fibrous material assembly impregnated with the liquid geopolymer composition (first alternative form) is then directly used in stage ii) or stage a) as defined in the invention.

Stage a) of Addition of a Gelling Composition

Stage a) of addition of a gelling composition can be carried out before stage i) or after stage i) of impregnation of the non-woven fibrous material.

Stage a) thus makes it possible to add the gelling composition to the liquid geopolymer composition alone (i.e. before stage i)) or to the liquid geopolymer composition impregnating the non-woven fibrous material (i.e. after stage i)).

The gelling composition is, in other words, a precursor composition of such a gel or a composition capable of forming a gel, in particular when it is added to the liquid geopolymer composition.

The gelling composition can comprise at least one precursor compound of a gel chosen from crosslinkable organic polymers, polysaccharides, organic monomers and one of their mixtures.

Mention may be made, among the polysaccharides, of starches, modified starches, alginates, modified alginates, chitosan, hyaluronic acid, carrageenans, polysaccharide gums, such as agar, xanthan gum or gellan gum, pectins, cellulose, cellulose derivatives, modified dextrans and hyaluronic acid.

Preferably, the polysaccharide used is in the form of a powder.

Mention may be made, among the crosslinkable organic polymers, of polyorganosiloxanes and poly(meth)acrylates.

Mention may be made, among the organic monomers, of acrylates, methacrylates and acrylamides.

The gelling composition can additionally comprise a crosslinking agent and/or a crosslinking catalyst and/or an initiator, in particular when the precursor compound of a gel is chosen from crosslinkable organic polymers and organic monomers.

The gelling composition can additionally comprise one or more viscosity agents (i.e. agents which increase the viscosity of said composition), such as, for example, calcium chloride, calcium carbonate or one of their mixtures, in particular when the precursor compound of a gel is chosen from polysaccharides and especially alginates.

The viscosity agent is preferentially soluble in the gelling composition at a temperature ranging from 15 to 40° C. approximately.

The precursor compound of a gel is preferably chosen from polysaccharides and particularly preferably from alg inates and starches, and more particularly preferably in the form of a powder.

Stage a) is preferably carried out after stage i).

According to a preferred embodiment of the invention, the addition of the gelling composition a) can be carried out by spraying a powder of the gelling composition over the liquid geopolymer composition or by mixing a liquid gelling composition with the liquid geopolymer composition.

The spraying of a powder of the gelling composition over the liquid geopolymer composition is preferred.

When the spraying a) is used after stage i), the non-woven material impregnated with the geopolymer composition can, for example, pass into a spraying cell comprising a tubular chamber and branches making possible the spraying of the gelling composition over the impregnated non-woven fibrous material [stages a) and ii)].

The spraying cell can be connected to a constricting device, in particular in order to make possible the confinement of the gel/non-woven material assembly around the elongated electrically conductive element when the second alternative form is used for stage iii) described below.

Stage ii) of Formation of a Gel Encapsulating the Non-Woven Fibrous Material

Stage ii) makes it possible to bring the liquid geopolymer composition from a liquid state to a gel state related to the presence of a gelling composition.

Stage ii) can be concomitant with stage a). In other words, the addition of the gelling composition to the liquid geopolymer composition makes it possible to directly form a gel encapsulating the non-woven material.

Stage ii) can be carried out after stage a). Preferably, in this embodiment, stage ii) is carried out in the presence of an external stimulus, such as the temperature or the presence of UV rays, for example in order to trigger a crosslinking.

By virtue of stages a) and ii), a gel encapsulating the non-woven fibrous material is formed, said gel comprising a geopolymer material. This thus makes it possible to pump a part of the excess water and/or to dry, at least at the surface, the non-woven fibrous material/polymer material assembly and thus to obtain a composite layer, the mechanical properties of which are retained over time.

By virtue of the presence of this gelling composition, a chemical or physical network, in the body or at the surface, is obtained during stage ii) which keeps the non-woven fibrous material in place and/or encapsulates it and/or acts as support, while protecting the composite layer obtained from a loss of water over time.

The process preferably does not comprise a drying stage, in particular because of the presence of stage ii). This is because the gel can make it possible to provide a surface gelling, thus contributing, at the end of stage ii), a dry texture to the touch after fixing of the water.

Stage $i_0$) of Preparation of the Liquid Geopolymer Composition

The process can additionally comprise, before stage i), a stage $i_0$) of preparation of the liquid geopolymer composition.

Stage $i_0$) is generally carried out at a high pH, in particular varying from 10 to 13.

Stage $i_0$) preferably comprises the following sub-stages:
$i_{01}$) the preparation of an aqueous solution of the first alkaline silicate, and
$i_{02}$) the mixing of the first aluminosilicate in the powder form with the aqueous alkaline silicate solution prepared in the preceding sub-stage $i_{01}$).

The aqueous solution the first alkaline silicate can be prepared by mixing silicon dioxide $SiO_2$ or an alkaline silicate with a base MOH in which M is K or Na.

The silicon dioxide $SiO_2$ can be chosen from silica fume (i.e. fumed silica), quartz and their mixtures.

Sub-stage 101) can be carried out by dissolving the alkaline base in water, bringing about a release of heat (exothermic reaction), and by then adding the silica (or the alkaline silicate). The heat given off then accelerates the dissolution of the silica (or of the alkaline silicate) during sub-stage $i_{01}$) and of the first aluminosilicate during sub-stage $i_{02}$).

When the second aluminosilicate and/or the second alkaline silicate as defined in the invention exist(s), stage $i_0$) of preparation of the liquid geopolymer composition can comprise the mixing of said first aluminosilicate (preferably in the powder form) and optionally of said second aluminosilicate (preferably in the powder form) with said first alkaline silicate (preferably in the form of an aqueous solution) and optionally said second alkaline silicate (preferably in the form of an aqueous solution).

Stage $i_0$) preferably comprises the mixing of the first and second metakaolins with the first alkaline silicate and optionally the second alkaline silicate, water and optionally an alkaline base.

The first and second metakaolins and the first and second alkaline silicates are as defined in the invention.

According to a preferred embodiment, stage $i_0$) comprises the following sub-stages:
$i_{0a}$) the mixing of the first and second alkaline silicates, preferably in the form of aqueous solutions, in particular with stirring,
$i_{0b}$) optionally the addition of an alkaline base, in particular while maintaining the stirring, and
$i_{0c}$) the addition of the first and second metakaolins, preferably in the form of powders, in particular while maintaining the stirring.

On conclusion of stage $i_0$) or of sub-stage $i_{02}$) or $i_{0c}$), a fluid and homogeneous solution is preferentially obtained.

On conclusion of stage $i_0$), the geopolymer composition can comprise from 35% to 80% by weight approximately and particularly preferably from 40% to 70% by weight approximately of solid substances (alkaline silicate(s), aluminosilicate(s) and alkaline base), with respect to the total weight of said liquid geopolymer composition.

Such a ratio by weight makes it possible to have a liquid geopolymer composition fluid enough to make it possible to handle it and the kinetics of solidification of which are slow enough to make possible the formation of a cable composite layer as defined below.

The solid substances/water ratio by weight in said liquid geopolymer composition can make it possible to determine the kinetics of solidification of said liquid geopolymer composition.

Stage $i_0$) is preferably carried out at ambient temperature (18-25° C. approximately).

Stage iii) of Application of the Non-Woven Fibrous Material Around the Cable

The process can additionally comprise a stage iii) of application of the non-woven fibrous material around a cable comprising at least one elongated electrically conductive element.

Stage iii) can be carried out either after the impregnation stage i), when the latter employs the non-woven fibrous material alone [first alternative form of the invention or stage i-af1)], or before the impregnation stage i), when the latter employs the cable/non-woven fibrous material assembly [second alternative form of the invention or stage i-af2)].

First Alternative Form

According to the first alternative form of stage i) of the invention (i.e. when stage i) is a stage i-af1)), stage iii) is then a stage iii-af1).

Stage iii-af1) is preferentially carried out after stage ii) as defined in the invention.

Thus, the non-woven fibrous material alone is impregnated with the liquid geopolymer composition according to stage i), a gel is formed according to stage ii) and then the gel/non-woven fibrous material assembly is applied around the elongated electrically conductive element according to stage iii-af1).

The non-woven fibrous material is preferably provided in the form of a strip or of a tape. This thus makes it possible to facilitate stage iii-af1).

The gel/non-woven fibrous material assembly can be applied either directly around one or more elongated conductive elements or around an internal layer of said cable which is itself around one or more elongated conductive elements.

When the non-woven fibrous material is a tape or a strip, the application stage iii-af1) can be carried out by winding the tape or the strip around the cable.

The winding can be longitudinal (i.e. along the longitudinal axis of the cable or, in other words, in the direction of the length of the cable) or helical, and preferably longitudinal.

The longitudinal winding can in addition be carried out with overlapping zones, the overlapping zone(s) representing from 10% to 20% approximately.

Stage iii-af1) can be carried out manually or in automated fashion and preferably in automated fashion.

Stage iii-af1) can be carried out by causing the gel/non-woven fibrous material assembly of stage ii) to pass into a constricting device or a conforming device (also designated by the terms "trumpet" or "tape former"). The cable comprising at least one elongated electrically conductive element also passes into the constricting device during stage iii-af1). This device is a mechanical device which continuously winds the gel/non-woven fibrous material assembly around the elongated electrically conductive element. This thus makes it possible to facilitate the longitudinal winding of the gel/tape assembly around the cable.

Stage iii-af1) is preferably carried out at ambient temperature (18-25° C. approximately).

Second Alternative Form

According to the second alternative form of stage i) of the invention (i.e. when stage i) is a stage i-af2)), stage iii) is then a stage iii-af2).

Stage iii-af2) is preferentially carried out before stage i) as defined in the invention.

Thus, the non-woven fibrous material alone is first applied around the elongated electrically conductive element according to stage iii-af2), then the cable/non-woven material assembly is impregnated with the liquid geopolymer composition according to stage i) and a gel is formed according to stage ii).

Stage iii-af2) makes possible the application of the non-woven material around the elongated electrically conductive element, in particular in order to form a cable comprising at least one elongated electrically conductive element and a non-woven fibrous material surrounding said elongated electrically conductive element.

According to this second alternative form, the non-woven fibrous material can be positioned on a dispenser, such as an unwinder or reel, and said material can be dispensed or unwound continuously in order to carry out at least stage iii-af2).

During stage iii-af2), the dispenser delivers the non-woven fibrous material at a speed V (in km/min).

The speed V is preferably identical to the speed of forward progression of the cable.

The speed V can range from 20 m/min to 280 m/min approximately and preferably from 50 m/min to 150 m/min approximately.

The non-woven fibrous material is preferably provided in the form of a strip or of a tape. This thus makes it possible to facilitate stage iii-af2).

The non-woven fibrous material can be applied either directly around one or more elongated conductive elements or around an internal layer of said cable which is itself around one or more elongated conductive elements.

On conclusion of stage iii-af2), a cable/non-woven fibrous material assembly is obtained.

When the non-woven fibrous material is a tape or a strip, the application stage iii-af2) can be carried out by winding the tape around the cable.

The winding can be longitudinal (i.e. along the longitudinal axis of the cable or, in other words, in the direction of the length of the cable) or helical, and preferably longitudinal. The longitudinal winding makes it possible to reduce the cost of production of the cable.

The longitudinal winding can in addition be carried out with overlapping zones, the overlapping zone(s) representing from 10% to 20% approximately.

Stage iii-af2) can be carried out manually or in automated fashion and preferably in automated fashion.

Stage iii-af2) can be carried out by causing the tape to pass into a constricting device or a conforming device (also designated by the terms "trumpet" or "tape former"). The cable comprising at least one elongated electrically conductive element also passes into the constricting device during stage iii-af2). This device is a mechanical device which continuously winds the tape around the elongated electrically conductive element. This thus makes it possible to facilitate the longitudinal winding of the tape around the cable.

Stage iii-af2) is preferably carried out at ambient temperature (18-25° C. approximately).

The second alternative form is preferred.

Stage iv) of Formation of the Polymer Sheath

The process can additionally comprise, after stage ii) or stage iii-af1), a stage iv) of application of an external protective sheath around the composite layer. The external protective sheath can make it possible to ensure the mechanical integrity of the cable.

On conclusion of stage iv), the cable can then comprise at least one elongated electrically conductive element, the composite layer surrounding said elongated electrically conductive element, and at least one external protective sheath surrounding said composite layer.

Stage iv) is preferably carried out by extrusion, in particular at a temperature ranging from 140° C. to 195° C. approximately.

Stage iv) can be carried out using an extruder.

In this embodiment, an extrusion head can be positioned at the outlet of the conforming device as defined in the invention.

The external protective sheath is preferably the outermost layer of the cable.

The external protective sheath is preferably an electrically insulating layer.

The external protective sheath is preferably made of a halogen-free material. It can conventionally be made from materials which retard flame propagation or which withstand flame propagation. In particular, if these materials do not contain halogen, such sheathing is said to be of HFFR (halogen-free flame retardant) type.

The external protective sheath can comprise at least one organic or inorganic polymer The choice of the organic or inorganic polymer is not limiting and these polymers are well known to a person skilled in the art.

According to a preferred embodiment of the invention, the organic or inorganic polymer is chosen from crosslinked and noncrosslinked polymers.

The organic or inorganic polymer can be a homopolymer or a copolymer having thermoplastic and/or elastomeric properties.

The inorganic polymers can be polyorganosiloxanes.

The organic polymers can be polyurethanes or polyolefins.

The polyolefins can be chosen from ethylene and propylene polymers. Mention may be made, as examples of ethylene polymers, of linear low-density polyethylene (LL-DPE), low-density polyethylene (LDPE), medium-density polyethylene (MDPE), high-density polyethylene (HDPE), copolymers of ethylene and of vinyl acetate (EVA), copolymers of ethylene and of butyl acrylate (EBA), of methyl acrylate (EMA) or of 2-ethylhexyl acrylate (2EHA), copolymers of ethylene and of α-olefins, such as, for example, polyethylene-octenes (PEO), copolymers of ethylene and of propylene (EPR), terpolymers of ethylene and of propylene (EPT), such as, for example, ethylene-propylene-diene monomer (EPDM) terpolymers, or one of their mixtures.

The polymer of the external protective sheath is preferably an organic polymer, more preferably an ethylene polymer and more preferably a copolymer of ethylene and of vinyl acetate, a linear low-density polyethylene or one of their mixtures.

The external protective sheath can also comprise a hydrated flame-retardant inorganic filler. This hydrated flame-retardant inorganic filler acts mainly physically by decomposing endothermically (e.g. release of water), the consequence of which is to lower the temperature of the sheath and to limit the propagation of flames along the cable. These are referred to in particular as flame-retardant properties.

The hydrated flame-retardant inorganic filler can be a metal hydroxide, such as magnesium hydroxide or aluminium trihydroxide.

The external protective sheath can additionally comprise an inert filler, in particular chosen from talc, micas, dehydrated clays and one of their mixtures.

The Composite Layer

The composite layer is preferably an electrically insulating layer.

In the present invention, the term "electrically insulating layer" is understood to mean a layer, the electrical conductivity of which can be at most $1 \cdot 10^{-9}$ S/m and preferably at most $1 \cdot 10^{-10}$ S/m (siemens per metre) (at 25° C.).

The composite layer is preferably a fire-retardant and/or fire-resistant layer.

The composite layer preferably exhibits a thickness ranging from 0.2 to 3 mm approximately and particularly preferably ranging from 0.5 to 1 mm approximately.

When the thickness of the composite layer is less than 0.2 mm, the thermal protection of the cable obtained according to the process of the invention is insufficient.

The composite layer of the invention is preferably a ribbon-like layer (i.e. in the form of a tape or of a strip).

The composite layer preferably exhibits a substantially constant thickness and constitutes in particular a continuous protective casing.

The composite layer can in particular comprise from 2 to 3 superimposed tapes.

The composite layer of the invention is preferably non-porous.

The composite layer is preferably an internal layer of said cable.

According to the invention, the term "internal layer" is understood to mean a layer which does not constitute the outermost layer of the cable.

The composite layer preferably comprises at least one geopolymer material, a gel (in which the geopolymer material is dispersed) and the non-woven fibrous material as defined in the invention.

The Geopolymer Material

In the present invention, the geopolymer material is obtained from a liquid geopolymer composition as defined in the invention, preferably by hardening, geopolymerization and/or polycondensation of said liquid geopolymer composition.

In particular, the liquid geopolymer composition as defined in the invention is capable of forming said geopolymer material. The ingredients of the liquid geopolymer composition can thus undergo a polycondensation to form said geopolymer material. The hardening is carried by an internal reaction of the polycondensation type. The hardening is not, for example, the result of simple drying, as is generally the case for binders based on alkaline silicates.

This is because the geopolymer materials result from an inorganic polycondensation reaction by alkaline activation, referred to as geosynthesis, in contrast to conventional hydraulic binders, in which the hardening is the result of a hydration of the calcium aluminates and calcium silicates.

In the present invention, the expression "geopolymer material" means a solid material comprising silicon (Si), aluminium (Al), oxygen (O) and at least one element chosen from potassium (K), sodium (Na), lithium (Li), caesium (Cs) and calcium (Ca) and preferably chosen from potassium (K) and sodium (Na).

The geopolymer material can be an aluminosilicate geopolymer material.

The aluminosilicate geopolymer material can be chosen from poly(sialates) corresponding to the formula (I) $M_n(\text{—Si—O—Al—O—})_n$ [(M)-PS] and having an Si/Al molar ratio equal to 1, poly(sialate-siloxos) corresponding to the formula (II) $M_n(\text{—Si—O—Al—O—Si—O—})_n$ [(M)-PPS] and having an Si/Al molar ratio equal to 2, poly(sialate-disiloxos) corresponding to the formula (III) $M_n(\text{—Si—O—Al—O—Si—O—Si—O})_n$ [(M)-PSDS] and having an Si/Al molar ratio equal to 3, and other poly(sialates) of Si/Al ratio>3, the abovementioned poly(sialates) comprising an alkaline cation M chosen from K, Na, Li, Cs and one of their mixtures, and n denotes the degree of polymerization.

In one embodiment, the geopolymer material represents from 5% to 98% by weight approximately, preferably from 55% to 95% by weight approximately and more preferably from 65% to 90% by weight approximately, with respect to the total weight of the composite layer.

According to a preferred embodiment of the invention, the non-woven fibrous material represents from 2% to 95% by weight approximately, particularly preferably from 5% to 45% by weight approximately and more preferentially still from 10% to 35% by weight approximately, with respect to the total weight of the composite layer.

According to a preferred embodiment of the invention, the gel represents from 0.1% to 15% by weight approximately, particularly preferably from 1% to 10% by weight approximately and more preferentially still from 2% to 6% by weight approximately, with respect to the total weight of the composite layer.

Advantageously, the cable obtained according to a process in accordance with the invention satisfies at least one of the fire reaction or non-propagation standards chosen from Standards EN 60332-1, EN 60332-3 and EN 50399 (2012/02+A1 2016); and preferably Standard EN 50399 (2012/02+A1 2016), in particular the B2ca, s1a, d0, a1 classification criteria of said standard, and optionally Standards EN 60332-1 and EN 60332-3.

According to one embodiment of the invention, the cable is a power and/or telecommunication cable and preferably an electric cable.

When the cable comprises a plurality of elongated electrically conductive elements, the composite layer can then surround the plurality of elongated electrically conductive elements of the cable.

The cable can comprise a single composite layer as defined in the invention or a plurality of composite layers as defined in the invention.

Preferably, the cable comprises a single composite layer and more particularly preferably a single internal composite layer.

According to one embodiment of the invention, the cable obtained according to the process of the invention additionally comprises one or more layers interposed between the elongated electrically conductive element and the composite layer as defined in the invention.

These layers can comprise one or more polymer layers, such as electrically insulating polymer layers.

In this case, the process additionally comprises, before stage iii), one or more stages of application of one or more of the abovementioned layers, around the elongated electrically conductive element, the assembly of the elongated electrically conductive elements, or around each of the elongated electrically conductive elements, according to the type of cable desired.

According to a preferred embodiment of the invention, the cable comprises:
  a plurality of electrically conductive elements, each of said electrically conductive elements being surrounded by a polymer layer, in particular an electrically insulating polymer layer, to form a plurality of insulated electrically conductive elements,
  a composite layer as defined in the invention surrounding said plurality of insulated electrically conductive elements, and
  an external protective sheath, in particular an electrically insulating sheath, surrounding said composite layer.

The process in accordance with the invention is preferably a continuous process. In other words, at least stages i), ii) and a) and preferably at least stages $i_0$), i), ii), a) and iii) are carried out continuously.

In the invention, the expression "continuous process" means that the process is carried out on a single production line and/or without resting, collecting or recovery stages. In other words, in the process in accordance with the invention, there are no intermediate resting stages between the dispensing of the non-woven fibrous material and the recovery/obtaining of the final cable. More particularly, stages i), ii) and a), or stages $i_0$), i), ii), a) and iii), are concomitant, i.e. stages i), ii) and a), or stages $i_0$), i), ii), a) and iii), are carried out at the same time.

In this embodiment, the non-woven fibrous material can be positioned on a dispenser, such as an unwinder or reel, and said material can be dispensed or unwound continuously in order to carry out at least stages i) and iii).

Preferably, the non-woven fibrous material in the form of a tape delivered by the unwinder or reel passes into the constricting or conforming device through which a cable comprising at least one elongated electrically conductive element progresses forward according to stage iii-af2), then the cable thus obtained passes into the impregnation bath or vat comprising the geopolymer composition according to stage i-af2), then the cable thus impregnated exits from the impregnation vat and enters the spraying cell in order to carry out stages a) and ii), then the cable obtained passes into the constricting device before entering the extruder head, in order to make possible the extrusion of the polymer sheath around the cable according to stage iv).

The dispenser delivers the non-woven fibrous material at a speed V (in km/min).

The speed V is preferably identical to the speed of forward progression of the cable.

Preferably, the impregnation bath or vat is fed with the geopolymer composition with a flow rate D (in kg/min). The flow rate D can range from 0.5 kg/min to 4.5 kg/min approximately.

The speed of forward progression of the cable in the process ranges from 20 m/min to 280 m/min approximately and preferably ranges from 50 m/min to 150 m/min approximately.

For reasons of clarity, only the components essential for the understanding of the invention have been represented diagrammatically in these figures, this being done without observing a scale.

DETAILED DESCRIPTION

Figure 1:
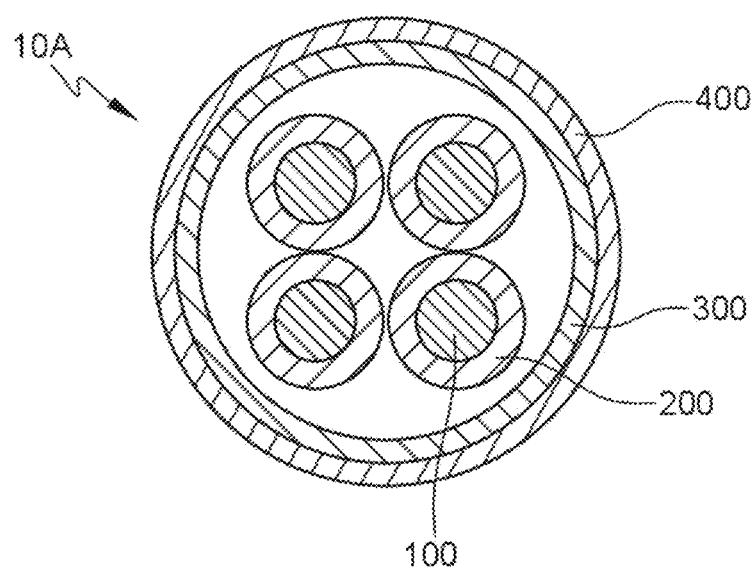
FIG. 1 represents a diagrammatic view in section of an electric cable as obtained according to the process in accordance with the invention.
Figure 2:
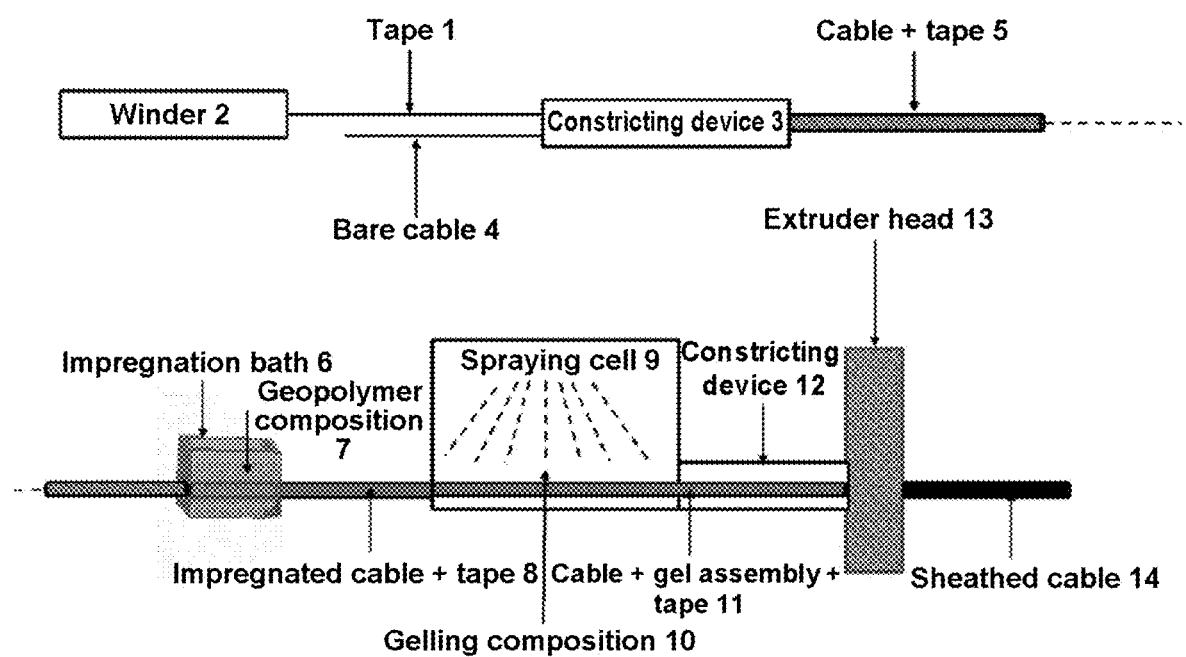
FIG. 2 represents a diagrammatic view of the process in accordance with the invention according to one embodiment.

The electric cable 10A, illustrated in FIG. 1, corresponds to a fire-resistant electric cable of K25 or RZ1K type.

This electric cable 10 comprises four elongated electrically conductive elements 1, each being insulated with an electrically insulating layer 200, and, successively and coaxially around these four insulated elongated electrically conductive elements (100, 200), a composite layer 3 as defined in the invention surrounding the four insulated elongated electrically conductive elements (100, 200) and an external sheath 400 of HFFR type surrounding the composite layer 300 as defined in the invention, and is advantageously provided in the form of a tape.

The following examples make it possible to illustrate the present invention. They do not have a limiting nature with regard to the overall scope of the invention as presented in the claims.

Example

A diagrammatic view of the process in accordance with the invention carried out continuously is illustrated in FIG.

2. In particular, a non-woven fibrous material 1 in the form of a tape is placed on a winder 2, unwound and conveyed to a constricting device 3 through which a cable comprising at least one elongated electrically conductive element 4 (bare cable 4) progresses forward, in order to make possible the longitudinal winding of the tape 1 around the cable 4 [stage iii-af2)]. Then, the cable obtained, comprising the elongated electrically conductive element and said non-woven fibrous material surrounding said elongated electrically conductive element 5, passes into an impregnation bath 6 comprising a geopolymer composition 7, in order to make possible the impregnation of the non-woven fibrous material 1 by said geopolymer composition 7 [stage i-af2)]. The impregnated cable 8 obtained then passes into a spraying cell 9 comprising a tubular chamber and branches making possible the spraying of a gelling composition 10 comprising 10 g of an alginate and 1 g of calcium chloride onto the impregnated cable 8 [stages a) and ii)]. At the exit of the spraying cell 9, the cable obtained 11 enters a constricting device 12 connected to said tubular chamber and is conveyed to an extruder head 13, in order to make possible the extrusion of the polymer sheath around the cable to form a sheathed cable 14 [stage iv)].

The composite layer obtained is dry and can be bent while retaining its cohesion without any tearing. Ageing tests show that stages a) and ii) make it possible to retain the flexibility properties after prolonged temperature ageing, unlike the use of a process without stages a) and ii). The fire properties are not detrimentally affected since the fire tests according to Standard EN50399 remain unchanged B2, s1, d1.

The invention claimed is:

1. A process for the manufacture of a cable comprising at least one elongated electrically conductive element and at least one composite layer surrounding said elongated electrically conductive element, said process comprising the steps of:
   i) impregnating a non-woven fibrous material, preferably in the form of a tape or of a strip, with a liquid geopolymer composition, and
   ii) forming a gel encapsulating or supporting said non-woven fibrous material, said gel comprising a geopolymer material, and
   said process additionally comprising a stage a) of addition of a gelling composition to the liquid geopolymer composition, in order to form said gel during stage ii).

2. The process according to claim 1, wherein the liquid geopolymer composition comprises at least one first aluminosilicate, at least one first alkaline silicate, water and optionally an alkaline base.

3. The process according to claim 1, wherein the non-woven fibrous material is chosen from cellulose materials, materials based on synthetic organic polymers, glass fibres and one of their mixtures.

4. The process according to claim 1, wherein stage i) is carried out on the non-woven fibrous material alone according to stage i-af1), and said stage i-af1) is carried out by coating impregnation.

5. The process according to claim 1, wherein stage i) is carried out on a non-woven fibrous material/cable assembly comprising at least one elongated electrically conductive element according to stage i-af2), and said stage i-af2) is carried out by dipping coating.

6. The process according to claim 1, wherein stage a) of addition of a gelling composition is carried out before stage i) or after stage i) of impregnation of the non-woven fibrous material.

7. The process according to claim 1, wherein the gelling composition comprises at least one precursor compound of a gel chosen from crosslinkable organic polymers, polysaccharides, organic monomers and one of their mixtures.

8. The process according to claim 1, wherein the gelling composition additionally comprises a crosslinking agent and/or a crosslinking catalyst and/or an initiator.

9. The process according to claim 1, wherein the precursor compound of a gel is chosen from alginates and starches.

10. The process according to claim 1, wherein the precursor compound of a gel is a polysaccharide in the form of a powder.

11. The process according to claim 1, wherein the addition of the gelling composition a) is carried out by spraying a powder of the gelling composition into the liquid geopolymer composition or by mixing a liquid gelling composition with the liquid geopolymer composition.

12. The process according to claim 1, wherein stage ii) is concomitant with stage a).

13. The process according to claim 1, wherein stage ii) is carried out after stage a), and stage ii) is carried out in the presence of an external stimulus.

14. The process according to claim 1, wherein the process is continuous.

15. The process according to claim 1, wherein said process additionally comprises a stage iii) of application of the non-woven fibrous material around a cable comprising at least one elongated electrically conductive element.

* * * * *